(12) United States Patent
Francois et al.

(10) Patent No.: US 11,140,951 B2
(45) Date of Patent: Oct. 12, 2021

(54) PIECE OF JEWELLERY MADE OF COMPOSITE ELASTOMER MATERIAL

(71) Applicant: Omega SA, Biel/Bienne (CH)

(72) Inventors: Nicolas Francois, Neuchatel (CH);
Julien Dahan, Porrentruy (CH);
Gregory Kissling, La Neuveville (CH)

(73) Assignee: Omega SA, Biel/Bienne (CH)

( * ) Notice: Subject to any disclaimer, the term of this patent is extended or adjusted under 35 U.S.C. 154(b) by 30 days.

(21) Appl. No.: 16/820,825

(22) Filed: Mar. 17, 2020

(65) Prior Publication Data

US 2020/0305560 A1 Oct. 1, 2020

(30) Foreign Application Priority Data

Mar. 26, 2019 (EP) .................... 19165120

(51) Int. Cl.
| | | |
|---|---|---|
| *A44C 5/00* | (2006.01) | |
| *A44C 27/00* | (2006.01) | |
| *B29C 48/34* | (2019.01) | |
| *B29C 48/08* | (2019.01) | |
| *B29C 48/17* | (2019.01) | |
| *B29C 48/154* | (2019.01) | |
| *B29L 31/00* | (2006.01) | |
| *B29L 7/00* | (2006.01) | |

(52) U.S. Cl.
CPC .......... *A44C 5/0053* (2013.01); *A44C 27/001* (2013.01); *B29C 48/08* (2019.02); *B29C 48/154* (2019.02); *B29C 48/17* (2019.02); *B29C 48/34* (2019.02); *B29L 2007/007* (2013.01); *B29L 2031/722* (2013.01); *B29L 2031/7276* (2013.01); *B29L 2031/739* (2013.01); *B29L 2031/742* (2013.01)

(58) Field of Classification Search
CPC .... A44C 5/0053; A44C 5/0069; A44C 27/001
See application file for complete search history.

(56) References Cited

U.S. PATENT DOCUMENTS

| | | |
|---|---|---|
| 2018/0373203 A1 | 12/2018 | Francois |
| 2019/0022912 A1 | 1/2019 | Rannoux et al. |

FOREIGN PATENT DOCUMENTS

| | | |
|---|---|---|
| EP | 2 468 127 A1 | 6/2012 |
| EP | 3 178 875 A1 | 6/2017 |
| JP | 2018-536078 A | 12/2018 |
| JP | 2019-501803 A | 1/2019 |

OTHER PUBLICATIONS

Office Action dated Mar. 9, 2021 in corresponding Japanese Patent Application No. 2020-048709 (with English Translation), 9 pages.
Korean Office Action dated May 12, 2021 in Korean Patent Application No. 10-2020-0034077 (with English translation), 12 pages.
European Search Report dated Sep. 26, 2019 in European Application 19165120.7 filed on Mar. 26, 2019 (with English Translation of Categories of Cited Documents), 3 pages.

*Primary Examiner* — Jack W Lavinder
(74) *Attorney, Agent, or Firm* — Oblon, McClelland, Maier & Neustadt, L.L.P.

(57) ABSTRACT

A piece of jewellery made from elastomer composite material, wherein the elastomer composite material includes a matrix made of elastomer in which between 0.5% and 4% by mass of cellulose fibres, between 0 and 2% by mass of an antibacterial additive, between 0 and 5% by mass of thermally conductive fillers, between 0 and 1% by mass of anti-odour agents, and between 0 and 1% by mass of silica are dispersed.

15 Claims, No Drawings

PIECE OF JEWELLERY MADE OF COMPOSITE ELASTOMER MATERIAL

CROSS-REFERENCE TO RELATED APPLICATION

This application claims priority to European Patent Application No. 19165120.7 filed on Mar. 26, 2019, the entire disclosure of which is hereby incorporated herein by reference.

FIELD OF THE INVENTION

The present invention relates to the technical field of materials containing elastomers. More precisely, the invention relates to a piece of jewellery made from an elastomer composite material, a method for manufacturing pieces, as well as the pieces obtained.

In the present invention, the term piece of jewellery designates any ornamental object, but also components used in horology or in jewellery. More particularly, the invention relates to wristlets, such as watch wristlets.

BACKGROUND OF THE INVENTION

Numerous elastomer materials exist on the market and are known for their use as a wristlet for example for their quality of comfort, of flexible touch and their strength.

Thus, it is known from the document JP 2000204265 to produce a thermoplastic elastomer material including antibacterial properties and having a good resistance to ageing.

From the patent EP 2 468 127 a piece of jewellery is also known, at least partly made from a composite material comprising an elastomer matrix in which reinforcing fillers are dispersed chosen from the group comprising microfibres, nanoparticles of polytetrafluoroethylene, and their mixtures, said composite material being obtained from a composition comprising between 60% and 95% by weight of at least one elastomer, between 0% and 5% by weight of microfibres and between 0% and 40% by weight of nanoparticles of polytetrafluoroethylene, based on the total weight of the composition, at least one of said reinforcing fillers being present.

However, these elastomer materials used for the wristlets or the horology components in contact with the skin do not allow to obtain a good evacuation of perspiration, the antibacterial properties only allowing to neutralise bad odours, and the fibres present in the material only allow the latter to be reinforced mechanically. Moreover, the wristlets are often subjected to friction or to abrasion which tends to remove a certain quantity of the antibacterial agent and thus reduce the effectiveness of the latter.

SUMMARY OF THE INVENTION

The goal of the invention is in particular to overcome the various disadvantages of these known techniques.

More precisely, a goal of the invention is to provide a piece of jewellery made of an elastomer material intended to be in prolonged contact with the skin (direct or indirect), and obtain an elastomer with properties allowing to improve the evacuation of perspiration, while preserving good colourability and good resistance to ageing (UV, perspiration, appearance, tearing).

These goals, as well as others that will appear more clearly below, are achieved according to the invention via a piece of jewellery made from elastomer composite material, said elastomer composite material comprising an elastomer matrix in which between 0 and 4% by mass of cellulose fibres, between 0 and 2% by mass of an antibacterial additive, between 0 and 5% by mass of thermally conductive fillers, between 0 and 1% by mass of anti-odour agents, and between 0 and 1% by mass of silica are dispersed.

According to other advantageous alternatives of the invention:
  The elastomer matrix is a fluoroelastomer of the fluorocarbon rubber type;
  the elastomer material comprises short cellulose fibres and long cellulose fibres, the length of the cellulose fibres being between 0.5 mm and 1.5 mm;
  the composite material comprises between 1.5% and 3.5% by mass of microfibres, and preferably 2% by mass of short microfibres and 1.5% by mass of long microfibres based on the total weight of the composition;
  the elastomer material comprises at least between 0 and 30% by mass of a colour additive;
  the elastomer material comprises at least between 0 and 1% by mass of anti-odour agents;
  the elastomer material comprises at least one mould release agent;
  the elastomer material comprises between 0 and 1% by mass of a brightening agent.
  The invention relates also and in particular to any piece of jewellery made from an elastomer material according to the invention.
  The invention also relates to a method for manufacturing a piece of jewellery according to the invention, the manufacturing method comprises the following steps:
    producing a composition comprising at least one elastomer, between 0.5% and 4% by mass of cellulose fibres, between 0 and 2% by mass of an antibacterial additive, between 0 and 5% by mass of thermally conductive fillers, between 0 and 1% by mass of anti-odour agents, and between 0 and 1% by mass of silica;
    carrying out a moulding of the composition obtained in the previous step;
    carrying out the finishing steps of the moulded piece obtained during the second step.
  According to this method, the elastomer material is a fluoroelastomer of the fluorocarbon rubber type.

Other features and advantages of the invention will appear more clearly upon reading the following description of a specific embodiment of the invention, given as a simple illustrative and non-limiting example.

DETAILED DESCRIPTION OF THE PREFERRED EMBODIMENTS

The invention relates to a piece of jewellery made from an elastomer composite material, said elastomer composite material comprising an elastomer matrix in which between 0 and 4% by mass of cellulose fibres, between 0 and 2% by mass of an antibacterial additive, between 0 and 1% thermally conductive fillers, between 0 and 1% anti-odour agents, and between 0 and 1% silica are dispersed.

According to the invention, the elastomer material chosen for the matrix is chosen from the fluoroelastomers.

The term "fluoroelastomer" is used in the general sense independently of the concentration of fluorine and designates both fluorinated elastomers, the main chain of which is partly substituted, that is to say the fluoroelastomers commonly called FKM, as well as the fluorinated elastomers, the main chain of which is entirely substituted, that is to say the perfluoroelastomers commonly called FFKM.

Preferably, the elastomer is a fluoroelastomer, and more preferably a fluoroelastomer of the FKM type.

The quantity of elastomer is between 55% and 95% by weight based on the total weight of the composition.

According to another embodiment, the elastomer material is chosen from one or more thermoplastic elastomers such as polyurethane, polyether block amide, the copolyester elastomers, the acrylic elastomers or the styrene elastomers.

According to yet another embodiment of the invention, the material is chosen from room-temperature-vulcanising elastomers such as the silicones.

The hardness of the elastomer material can be chosen over a range from 20 shore OO to 90 shore D according to the haptic and functional need.

It is possible to produce by moulding hard elements of a case with hardnesses of 90 shore D for example, while the shore OO and shore A materials would rather be used as a coating on a hard element. The flexible parts such as the wristlets would be made using a shore A hardness.

For example, in the case of a watch case, the elastomer can be sprayed at the surface of the case and act as a coating, or overmoulded to provide a soft touch.

According to the invention, the elastomer material comprises thermally conductive fillers having a thermal conductivity greater than 20 W·m-1·K-1, like hexagonal boron nitride or graphene or carbon nanotubes, for example. The quantity of these thermally conductive fillers in the elastomer material is between 0.04% and 5% by mass and allows to increase the thermal conductivity of the material by a factor of 3, from 0.4 to 1.2 W·m-1·K-1 without increasing the electrical conductivity of the latter. Such thermally conductive fillers have the advantage of better evacuating body heat and thus of limiting perspiration.

According to an advantageous aspect of the invention, the elastomer material also comprises an antibacterial additive for example containing silver in such a way as to limit, or even prevent, the development of bacteria, on the surface and inside the material, caused substantially by the perspiration of the wearer when the wristlet is in contact with the skin for example.

Preferably, the antimicrobial additive used is Sanitized® BC A 21-41. This additive is in the form of silver encapsulated in a material made of ceramic class, its resistance to high temperatures allows to easily add it to the mixture without altering the antibacterial properties. According to the needs, the quantity of antimicrobial additive is between 0% and 2% by mass.

The elastomer material also comprises an anti-odour agent such as for example zeolite (Lithofill MM) in such a way as to absorb the odours, generally this agent is in the form of a grain having a size of 0 to 10 μm. According to the needs, the quantity of anti-odour agent is between 0% and 1% by mass. According to an alternative of the invention, the zeolite can act as a support for diffusing a perfume, said zeolite can for example receive one or more essential oils or one or more fragrances. Such an embodiment is of particular interest given the fact that the zeolite allows to diffuse the perfume over a very long time.

The elastomer material comprises a reinforcing agent such as silica for improving its durability.

According to the invention, the elastomer material comprises hydrophilic microfibres arranged to evacuate humidity, and in particular perspiration, through the elastomer material. According to the present invention, the hydrophilic microfibres have a fineness of less than 150 mTex, which is a size sufficient to be able to transport the molecules of the $H_2O$ type.

According to the invention, the hydrophilic fibres are made from a cellulose material, and fibres of the Lyocell type such as Lenzing Tencel FCP are preferably used.

Preferably, the composition according to the invention comprises between 0.5% and 4%, preferably between 1.5% and 3.5%, by weight of microfibres based on the total weight of the composition. The microfibres used have a length of between 0.5 mm and 1.5 mm.

The presence of these microfibres in the material allows to form a network of microscopic channels, and the nanofibrils forming the microfibres lead humidity rapidly and uniformly through the material.

In such a way as to improve the transport of humidity through the material, the microfibres incorporated into the material are composed of short cellulose microfibres and long cellulose microfibres, the length of the cellulose microfibres being between 0.5 mm and 1.5 mm.

The composition according to the invention comprises 2% by weight of short microfibres and 1.5% by weight of long microfibres based on the total weight of the composition.

Such a mixture of short microfibres and long microfibres touch each other and form channels improving the diffusing power of the matrix formed by the elastomer material and humidity can be transported by capillarity through the material and thus be evacuated.

According to the invention, the microfibres preferably have a transverse cross-section in the shape of a propeller to give them a greater specific surface area and thus a power of faster diffusion.

More precisely, the cross-section of the hydrophilic fibres is in the shape of a propeller with n blades with n strictly greater than two, in such a way as to offer a greater specific surface area and thus promote the evacuation of humidity.

The composition can also comprise vulcanisation or cross-linking agents specific to the elastomer, and other conventional additives commonly used by a person skilled in the art in the field of the formulations containing elastomer, and more particularly of the formulations containing fluoroelastomer.

Advantageously, the composition can comprise a colourant or a pigment. Mixtures of colourants and/or of pigments can also be used.

For example titanium dioxide is used to produce a composition of a white colour, in this case the quantity of colourant used is 30% by mass. In such a way as to improve the finish of the white colour a brightening agent is used, the latter allows to rebalance the spectrum of colours and to provide a whiter white. The quantity of brightening agent used is approximately 1% by mass.

In the case of a white composition, up to 10% by mass of a transparent fluoroelastomer of the FKM type is added to improve the resistance to soiling of the composition and improve the flexibility of the final product.

In the case of a composition of a black colour, a fluoroelastomer of the FKM type of a black colour is directly used. The black colour can be obtained via carbon black (Grade N-660).

The material described above can be directly moulded to produce single-material strands of wristlets made of comfortable elastomer, or overmoulded to produce comfortable two-material strands of wristlets, each strand having a first lower part made of comfortable material in contact with the skin, and an upper part made of another material advantageous for its function. It is also possible for each of the parts to have a different colour for purely aesthetic purposes.

Below, three examples of composition are described, each of them comprises a base that forms the elastomer matrix in which the additives are dispersed. These examples are based on samples produced by the applicant according to the invention.

For a wristlet of a black colour, the following composition is used:

First Step (Black Base)

| Ingredient | Details | % mass |
|---|---|---|
| FKM | P-457 (Solvay) | 100 |
| NC | Grade N-660 (cabot) | 22 |
| Oil | Nafol 1822B (Sasol) | 1.5 |
| Vulc | Drimix Kenrich (TAIC) | 3 |
| Vulc | Luperox 101XL45 | 2.5 |

2nd Step (Mixture of the Comfort Additives into the Base)

| Ingredient | Details | % mass |
|---|---|---|
| Black base | According to the formula below | 100 |
| Short cellulose | Lenzing Tencel FCP, 0.5 mm | 2 |
| Long cellulose | Lenzing Tencel FCP, 1.5 mm | 1.5 |
| Zeolite | Lithofill MM | 0.5 |
| Graphene (*) | 8 to 12 layers; 3 mu | 0.045 |
| Silica | Aerosil 200 | 0.5 |
| Antibacterial | Sanitized BCA21-41 | 2 |

(*) The graphene here is the filler chosen in order to improve the thermal conductivity of the mixture and thus to improve the exchange of heat between the skin and the wristlet.

For a wristlet of a white colour, the following composition is used:

1st Step (Neutral Base)

| FKM | P-457 | 100 |
|---|---|---|
| Oil | Nafol 1822B (Sasol) | 1.5 |
| Vulc | Drimix Kenrich (TAIC) | 3 |
| Vulc | Luperox 101XL45 | 2.5 |
| Silica | Aerosil 200 | 17 |

2nd Step (Mixture of the Comfort Additives into the Neutral Base)

| Neutral base | According to above formula | 100 |
|---|---|---|
| Short cellulose | Lenzing Tencel FCP, 0.5 mm | 2 |
| Long cellulose | Lenzing Tencel FCP, 1.5 mm | 1.5 |
| Zeolite | Lithofill MM | 0.5 |
| hBN boron nitride (*) | 3M ™ Boron Nitride Cooling Filler Flakes CFF 500-3 and 200-3 | 5 |
| TiO2 | Tl Pure R104, dupont | 30 |
| Silica | Aerosil 200 | 0.5 |
| Antibacterial | Sanitized BCA21-41 | 2 |
| Optical brightener | | 1 |
| Zinc stearate | | 0.5 |
| Transparent FKM (*) | P-957, Solvay | 10 |

(*) The hexagonal boron nitride is the filler chosen in order to improve the thermal conductivity of the mixture and thus to improve the exchange of heat between the skin and the wristlet.
(*) The transparent FKM is added at the end of mixing at a high shear rate in order to create a polyphase mixture (dispersion of the transparent FKM in the mixture initially produced): this technique allows to improve the resistance to soiling of the white mixture and to improve its flexibility and thus the comfort when wearing.

For the wristlets having another colour, the following composition is used:

1st Step (Neutral Base)

| FKM | P-457 | 100 |
|---|---|---|
| Oil | Nafol 1822B (Sasol) | 1.5 |
| Vulc | Drimix Kenrich (TAIC) | 3 |
| Vulc | Luperox 101XL45 | 2.5 |
| Silica | Aerosil 200 | 17 |

2nd Step (Mixture of the Additives into the Neutral Base)

| Neutral base | According to above formula | 100 |
|---|---|---|
| Short cellulose | Lenzing Tencel FCP, 0.5 mm | 2 |
| Long cellulose | Lenzing Tencel FCP, 1.5 mm | 1.5 |
| Zeolite | Lithofill MM | 0.5 |
| hBN boron nitride (*) | 3M ™ Boron Nitride Cooling Filler Flakes CFF 500-3 and 200-3 | 5 |
| Silica | Aerosil 200 | 0.5 |
| Antibacterial | Sanitized BCA21-41 | 2 |
| Optical brightener | | 1 |
| Zinc stearate | | 0.5 |

The piece of jewellery made of elastomer composite material according to the invention is obtained by a method comprising the following steps:
  carrying out a preparation of a composition as described above;
  carrying out a moulding of the composition obtained during the first step to obtain the desired shape;
  carrying out the finishing steps of the moulded piece obtained during the second step.

According to the needs of a person skilled in the art and of the pieces to be produced, the finishing steps of the moulded piece can involve sewing, the printing of a pattern, the creation of holes in the material, etc.

The moulding of the composition can be carried out by any type of method known to a person skilled in the art, such as injection, extrusion or compression moulding.

The vulcanisation is carried out in a known manner at a temperature generally comprised between 130° C. and 200° C., for a sufficient time that can vary according to the desired part, for example between 60 and 300 seconds according to the vulcanisation temperature, the vulcanisation system adopted and the vulcanisation kinetics of the composition.

The piece of jewellery can be for example a wristlet, in particular a watch wristlet. More specifically, a wristlet according to the invention can have particular shapes and cutouts and satisfy despite everything strict specifications in terms of mechanical strength, and more specifically in terms of tensile strength, of resistance to soiling, while providing good evacuation of the sweat of the wearer.

Such a material for improving comfort allows to manufacture timepieces or jewels such as wristlets, wristlet buckles, necklaces, cases, case backs, buttons, buckles or glasses.

Of course, the present invention is not limited to the example illustrated and is liable to various alternatives and modifications that appear to a person skilled in the art.

The invention claimed is:
1. A piece of jewelry made from elastomer composite material, wherein the elastomer composite material comprises a matrix made of elastomer wherein between 0 and 4% by mass of cellulose fibres, between 0 and 2% by mass of an antibacterial additive, between 0 and 5% by mass of thermally conductive fillers, between 0 and 1% by mass of anti-odour agents, and between 0 and 1% by mass of silica are dispersed.

2. The piece of jewelry according to claim 1, wherein the elastomer is a fluoroelastomer of the fluorocarbon rubber type (FKM).

3. The piece of jewelry according to claim 1, wherein the composite material comprises short cellulose fibres and long cellulose fibres, the length of the cellulose fibres being between 0.5 mm and 1.5 mm.

4. The piece of jewelry according to claim 3, wherein the composite material comprises between 1.5% and 3.5% by mass of microfibres, and preferably 2% by mass of short microfibres and 1.5% by mass of long microfibres based on the total weight of the composition.

5. The piece of jewelry according to claim 1, wherein the elastomer material comprises at least between 0 and 30% by mass of a colour additive.

6. The piece of jewelry according to claim 1, wherein the elastomer material comprises at least between 0 and 1% by mass of anti-odour agents.

7. The piece of jewelry according to claim 1, wherein the elastomer material comprises at least one mould release agent.

8. The piece of jewelry according to claim 1, wherein the elastomer material comprises a brightening agent.

9. A method for manufacturing a piece of jewelry according claim 1, comprising the following steps:
producing a composition comprising at least one elastomer, between 0% and 4% by mass of cellulose fibres, between 0 and 2% by mass of an antibacterial additive, between 0 and 5% by mass of thermally conductive fillers, between 0 and 1% by mass of anti-odour agents, and between 0 and 1% by mass of silica;
carrying out a moulding of the composition obtained in the previous step;
carrying out the finishing steps of the moulded piece obtained during the second step.

10. The method according to claim 9, wherein the elastomer is a fluoroelastomer of the fluorocarbon rubber type.

11. The method according to claim 9, wherein the composition comprises short cellulose fibres and long cellulose fibres, the length of the cellulose fibres being between 0.5 mm and 1.5 mm.

12. The method according to claim 9, wherein the composition comprises thermally conductive fillers.

13. The method according to claim 9, wherein the composition comprises anti-odour agents.

14. The method according to claim 9, wherein the composition comprises reinforcing fillers.

15. The method according to claim 9, wherein the composition comprises at least one colour additive.

* * * * *